United States Patent
Hilgendorf et al.

[11] Patent Number: 5,925,124
[45] Date of Patent: Jul. 20, 1999

[54] DYNAMIC CONVERSION BETWEEN DIFFERENT INSTRUCTION CODES BY RECOMBINATION OF INSTRUCTION ELEMENTS

[75] Inventors: Rolf Hilgendorf, Böblingen; Hartmut Schwermer, Stuttgart; Werner Soell, Schönaich, all of Germany

[73] Assignee: International Business Machines Corporation, Armonk, N.Y.

[21] Appl. No.: 08/810,880

[22] Filed: Mar. 5, 1997

[30] Foreign Application Priority Data

Feb. 27, 1997 [EP] European Pat. Off. ............. 97103233

[51] Int. Cl.[6] .................................................. G06F 9/30
[52] U.S. Cl. ......................... 712/227; 712/209; 712/226
[58] Field of Search .................................. 395/385, 568, 395/567, 384, 386, 387, 388, 389

[56] References Cited

U.S. PATENT DOCUMENTS

| | | | |
|---|---|---|---|
| 4,236,204 | 11/1980 | Groves | 395/567 |
| 4,415,969 | 11/1983 | Bayliss et al. | 395/387 |
| 4,791,559 | 12/1988 | Byers | 395/389 |
| 4,839,797 | 6/1989 | Katori et al. | 395/386 |
| 5,115,500 | 5/1992 | Larsen | 395/385 |
| 5,455,955 | 10/1995 | Kida et al. | 395/384 |
| 5,568,646 | 10/1996 | Jaggar | 395/358 |
| 5,638,525 | 6/1997 | Hammond et al. | 395/385 |

*Primary Examiner*—Richard L. Ellis
*Attorney, Agent, or Firm*—Marc A. Ehrlich

[57] ABSTRACT

The invention provides an apparatus and a method for converting instructions of a code A to instructions of a code B. Said conversion is performed by obtaining rearrangement information, which corresponds to the instruction that is to be converted, from a table. Said rearrangement information is then used to rearrange the instruction elements of the initial instruction, in order to generate instructions of code B, which functionally corresponds to said initial instruction. Said rearrangement can be performed by multiplexing means, which use said instruction elements of the initial code A instruction as input, and which select one of said instruction elements, or the content of another register, and forward this selected data to the instruction that is to be generated. Said rearrangement information is directly used to control the selection performed by said multiplexers.

20 Claims, 4 Drawing Sheets

DYNAMIC CONVERSION BETWEEN DIFFERENT INSTRUCTION CODES BY RECOMBINATION OF INSTRUCTION ELEMENTS

FIELD OF THE INVENTION

This invention is related to conversion of instructions from one instruction set to another instruction set, and in particular to translation of code of a first computer architecture to code of a second computer architecture.

BACKGROUND OF THE INVENTION

In each computing system, there has to exist a precise definition of the instructions the processor can handle, of the format of these instructions, and of the arguments and operands required by these instructions. This definition of a processor's instruction set is usually referred to as the architected code.

There exist a multitude of different codes, and each code can only be handled by the corresponding processor type. Compilers, which translate programs written in a higher language to a sequence of basic processor instructions, are only capable of producing code corresponding to one specific computer architecture. It would be desirable to be able to process programs written in different codes by one processor type. Thus, programs written for different computer architectures could be processed, which implies that the range of programs available for each processor type would increase. Recompiling source code in order to produce suitable code for the different processor types would no longer be necessary.

There often exist different versions of instruction sets for one processor type. Being able to convert instructions from one instruction set to another would thus also allow a quick handling of updated code.

For a long time, the debate has been going on about whether CISC (Complex Instruction Set Computing) or RISC (Reduced Instruction Set Computing) is better suited for high performance computing. When CISC instructions are processed, lots of tasks are performed in parallel. CISC instructions usually are long and complex. Because of the inherent parallelism, large processor cycle times are required. The typical pipeline for CISC computing comprises a rather low amount of pipeline stages. CISC instructions are hard to bring to a common format.

In contrary, RISC instructions are short and simple and do not start a lot of parallel tasks when they are executed. They only fulfill one well-defined task, and they can easily be brought to one common format. Execution units for RISC processing comprise pipelines with a large amount of pipeline stages. The processor cycle for RISC processing can be very short, which means that instructions can be quickly clocked through the different pipeline stages.

Modern superscalar processing concepts suggest to process the basic instructions out of their sequential order, which means that any parallelism hidden in a sequential program is exploited. A performance gain is achieved by dispatching a multitude of completely independent instructions from different points of the instruction stream to various execution units in the same clock cycle. For a number of reasons, RISC instructions are better suited for out-of-order processing than CISC instructions. Because a typical RISC instruction only defines one task, the instruction itself, together with its source and target operands, can be brought to a simple format. Furtheron short cycle times are possible. This is especially important for out-of-order processing since the resolution of data dependencies, including register renaming, is one of the major challenges.

Considering all these arguments, one might conclude that a superscalar processor having a RISC architecture is favorable. On the other hand, CISC is a widespread standard in many fields, and there exists a lot of code for CISC architectures. For this reason, it makes sense to break up external CISC instructions to a number of internal RISC instructions which can then be processed out-of-order by a superscalar RISC processor. Such a processing concept requires a powerful CISC to RISC converter.

Several solutions have been proposed for code conversion at run time. In IBM TDB Publication "System/370 Emulator Assist Processor For A Reduced Instruction Set Computer", Vol. 30, No. 10, March 1988, to J. Garcia, E. S. Hannon, R. Kalla, J. A. Mitchell and D. M. Zareski, microcode-controlled conversion of the external S/370 code, which is a CISC code, to the internal RISC instructions is described. First, the "Emulation Assist Processor" loads an external S/370 instruction which is to be translated. Next, microcode from a specialized local microcode control store is executed in order to generate multiple host instructions for said single S/370 instruction.

Compared to a real hardware-controlled translation, any translation that is done by executing microcode routines is slow. For a code conversion at run time, code translation from the external CISC instructions to internal RISC instructions may only take several cycles. Microcode-controlled conversion takes a lot of cycles, because the whole microcode routine has to be executed.

Furtheron, the emulation assist processor can only translate one instruction at a time. Parallel conversion of several instructions dispatched at the same time is therefore impossible.

A more refined converting scheme is described in European Patent Application 651 320 A1, "Superscalar Instruction Decoder", to D. B. Witt and M. D. Goddard. In this document, a decoder is described, which translates CISC instructions to a number of RISC instructions at run time. The RISC instructions emerging from the decode process are forwarded to a RISC superscalar processor. Thus, use of a CISC instruction set can be combined with the advantages of superscalar RISC processing. Dependent on the number of RISC-like operations to be generated from one CISC instruction, two translation paths are described: in case the number of RISC operations to be generated exceeds three, code translation is performed by executing a microcode routine. For CISC operations with less complexity, which can be expressed by less than four RISC-like operations, a fast conversion path is implemented. Register identifiers of the CISC instruction are routed by means of programmable array logic (PAL) or combinatorial logic to the corresponding RISC-like operations.

In case any architectural changes are made to either the external or the internal code, the decode logic would have to be changed. It also would have to be changed if errors in the conversion path arise. In case of combinatorial logic, the whole logic will have to be remapped. In case of programmable array logic, reprogramming the logic is possible in order to implement changes. But it is difficult to implement selective changes. Reprogramming a certain conversion function of the PAL requires to reprogram the whole logic, and therefore, it would be desirable to be able to change the conversion path in a more selective way.

OBJECT OF THE INVENTION

It is an object of the invention to provide a code converter capable of converting instructions from a code A to a code B, which avoids the drawbacks of the prior art, and which provides for a fast instruction decode at run time, for the possibility of decoding several instructions in parallel, and for an easy implementation of changes to the conversion path.

SUMMARY OF THE INVENTION

The invention provides both an apparatus and a method for converting instructions of a code A to instructions of a code B, whereby each of said instructions of code A and each of said instructions of code B consist of instruction elements.

According to the invention, rearrangement information is obtained, in a first step, from at least one table, said rearrangement information corresponding to an instruction of said instructions of code A that is to be converted to code B. Said instruction elements of said instruction of code A are rearranged according to said rearrangement information, in a second step, in order to generate at least one instruction of said instructions of code B.

Said rearrangement is done by rearrangement means, which use instruction elements of said instruction of code A as a first input and use said rearrangement information corresponding to said instruction of code A as a second input, and which rearrange said instruction elements of said instruction of code A according to said rearrangement information in order to generate at least one instruction of said instructions of code B functionally corresponding to said instruction of code A.

The initial instruction of code A already contains the identifiers of logical registers that are necessary for generating an instruction of code B. Instead of rearranging the OP-codes, the register identifiers, status information, addresses etc. by logic means in order to generate an instruction of code B, the recombination is performed according to a pattern in a table that is related to said initial instruction of code A.

This provides for a fast instruction translation, which only requires one cycle, because the bit pattern stored in said table can directly be used by a hardware to perform the correct routing of logical register addresses, status bits, logical register identifiers, etc. This only takes one cycle, and therefore, instruction translation and decoding can be performed at run time.

Another advantage of the invention is that the rearrangement information contained in said table means can easily be exchanged. In case there exist any errors or inconsistencies of the way instruction elements of the initial instruction are routed to the new instruction, these errors can easily be fixed by changing the table accordingly. In case of an update of either the architected code A or code B, or in case new features and/or instructions are included in any of both codes, the necessary changes can easily be made to said table means. An important point is that said changes can be implemented selectively, which means that only the instructions that have been changed have to be updated.

In order to increase performance, it might be favorable to convert several instructions of code A in parallel. Rearrangement of each of said instructions can be done by accessing one common table, because several entries of said table can be accessed in parallel. It is necessary, though, to provide a multitude of rearrangement means, corresponding to the number of initial instructions that are to be converted. In case any changes have to be made, said changes have to be made only to one central table, because said table contains all the necessary rearrangement information. This allows for a much simpler update compared to logic conversion means, where each conversion path would have to be changed. With said table means, it is easy to survey how instructions are converted.

In a further embodiment of the invention, said table means are realized as RAM table means.

Implementing said table as a RAM table provides for an especially easy way to change table contents. Any architectural changes can easily be considered. The external architecture may be well defined, but still architects add functionality to it or take away obsolete instructions. Environments may exist which need only subsets of the defined instructions or it may not be allowed to use all instructions. By changing the data loaded into the table, these requirements can be considered.

A further advantage is that errors can easily be corrected. If an error has occurred at the time an instruction has been implemented, and said error is detected late in the design cycle, for example after first power-on, it is possible, by changing the contents of said table, to build up a circumvention for the instruction concerned. Thus, one is able to continue testing the design, which reduces time-to-market and can thus save a lot of money.

In another embodiment of the invention, said table means are realized as ROM table means.

Changes to the table's entries, which might become necessary due to architectural changes or due to errors, can be taken care of by changing the ROM accordingly. But the main advantage of this implementation is that access time to a ROM is very short. A further advantage is that the chip area required for a ROM table is very small.

In a further embodiment of the invention, said instructions of code A are CISC instructions and said instructions of code B are RISC instructions.

Each CISC instruction of the external instruction stream is converted to at least one internal RISC instruction. This embodiment is especially useful when a sequence of CISC instructions has to be processed by a superscalar RISC processor. As each CISC instruction usually has to be replaced by a number of RISC instructions, it is advantageous to address a table entry that contains all the necessary rearrangement information for generating the required number of RISC instructions. A fast and efficient CISC/RISC decode becomes possible. Changes of both the external CISC code or the internal RISC code can easily be implemented.

In another embodiment of the invention, both said instructions of code A and said instructions of code B are RISC instructions.

The possibility of converting one set of RISC instructions to a different set of RISC instructions allows to process an instruction stream of code A by a processor which normally can only handle instruction code B. By means of translation tables containing rearrangement information, one processor can process a variety of different RISC codes which are not the architected codes of said processor. By either using different tables in parallel or by exchanging the contents of a table, it is possible to switch between different codes. As code conversion is achieved at run time, one processor can "understand" a lot of different RISC code flavors.

In a preferred embodiment of the invention, said rearrangement means are realized as multiplexing means, which multiplex said instruction elements of said instruction of code A to respective data fields representing instruction elements of at least one functionally corresponding instruction of said instructions of code B.

In order to reassemble the instruction elements of an external instruction, said instruction elements are forwarded to a multiplexer, which multiplexes said instruction elements to various data fields of the internal instruction. For a number of reasons, it is advantageous to use a multiplexer for rearrangement of the initial instruction elements: A multiplexer is a standard device that is cheap and easy to implement. Multiplexers can be realized as fast-operating devices, and therefore, rearranging said initial instruction elements can be done in one processor cycle. Furtheron, control lines can easily be implemented, with said control lines selecting the initial instruction element that is to be forwarded to a certain multiplexer's output, in order to be written to a data field of the resulting internal instruction.

According to another embodiment of the invention, said rearrangement information corresponding to said instruction of code A comprises routing information per instruction element of said instruction or said instructions of code B, with said routing information determining which of said instruction elements of said instruction of code A is to be forwarded to a respective data field representing one of said instruction elements of said instruction or said instructions of code B.

When an external instruction of code A is converted to internal instructions of code B, the table entry of said table means corresponding to said external instruction is accessed. This table entry contains said rearrangement information, which controls the rearrangement of different parts of the external instruction, in order to generate the internal instructions. In case said rearrangement means are realized as multiplexers, said rearrangement information directly controls said multiplexers. For each data field of an internal instruction of code B that is to be generated, one of the instruction elements of said external instruction of code A has to be selected, which is to be written to said data field. Thus, said rearrangement information contained in said table has to comprise routing information per code B data field, which selects the instruction element that is to be routed to said code B data field. All the instruction elements of an external code A instruction are used as inputs to a multiplexer, and the output of said multiplexer directly writes to one of said data fields of the code B instruction to be generated. In such a solution, there has to be provided one multiplexer per data field of the internal instruction.

Segmenting said rearrangement information according to the data fields of the instructions to be generated allows to directly control said rearrangement means with said rearrangement information, because said information can directly be used to select the correct input. Said routing information is used to directly determine which input is to be forwarded to said multiplexer's output. Therefore, this way of segmenting said rearrangement information is straightforward and allows for a fast instruction conversion.

According to another embodiment of the invention, said table means relate an instruction of said instructions of code A to the number of functionally corresponding instructions of code B.

When converting instructions, the external instruction has to be replaced by internal instructions in a way that exactly the same operations performed by the external instructions are performed by the internal instructions, though the codes are completely different. The instructions of code B have to functionally correspond to said external instruction of code A. In many cases it is impossible to replace one external instruction by one corresponding internal instruction. Instead, several internal instructions are necessary to completely emulate said external instruction.

This becomes obvious when looking at complex CISC instructions. Each CISC instruction performs a lot of tasks and therefore, several internal RISC operations are necessary to achieve the same functionality.

In case more than one internal instruction has to be generated, the table entry corresponding to the external instruction contains the number of said internal instructions to be generated. Rearrangement information is provided for each of the internal instructions. Therefore, all the corresponding code B instructions can be generated in parallel, which makes instruction decoding a lot faster.

Especially when decoding CISC instructions at run time, it is important that the RISC-like operations emerging from each CISC instruction can be generated in parallel.

According to a further embodiment of the invention, said table means relate an instruction of said instructions of code A to at least one OP-code of at least one functionally corresponding instruction of said instructions of code B.

The OP-code of the external instruction of code A that is to be translated is used to find the corresponding entry in said table means. Said entry relates said initial OP-code to all the OP-codes of the internal instructions that are to be generated. Thus, one or more OP-codes are contained in each table entry.

While the usual case for RISC-to-RISC conversion is a one-to-one correspondence between the OP-codes of code A and the OP-codes of code B, there have to exist several OP-codes of code B per OP-code of code A in case of CISC decoding. The OP-codes of code B obtained from said table means are used, together with register identifiers, status information, etc. contained in the external instruction, to build the corresponding internal instructions of code B. Storing the corresponding code B OP-codes directly in said table means provides for a fast instruction conversion.

DETAILED DESCRIPTION OF THE INVENTION

Figure 1:
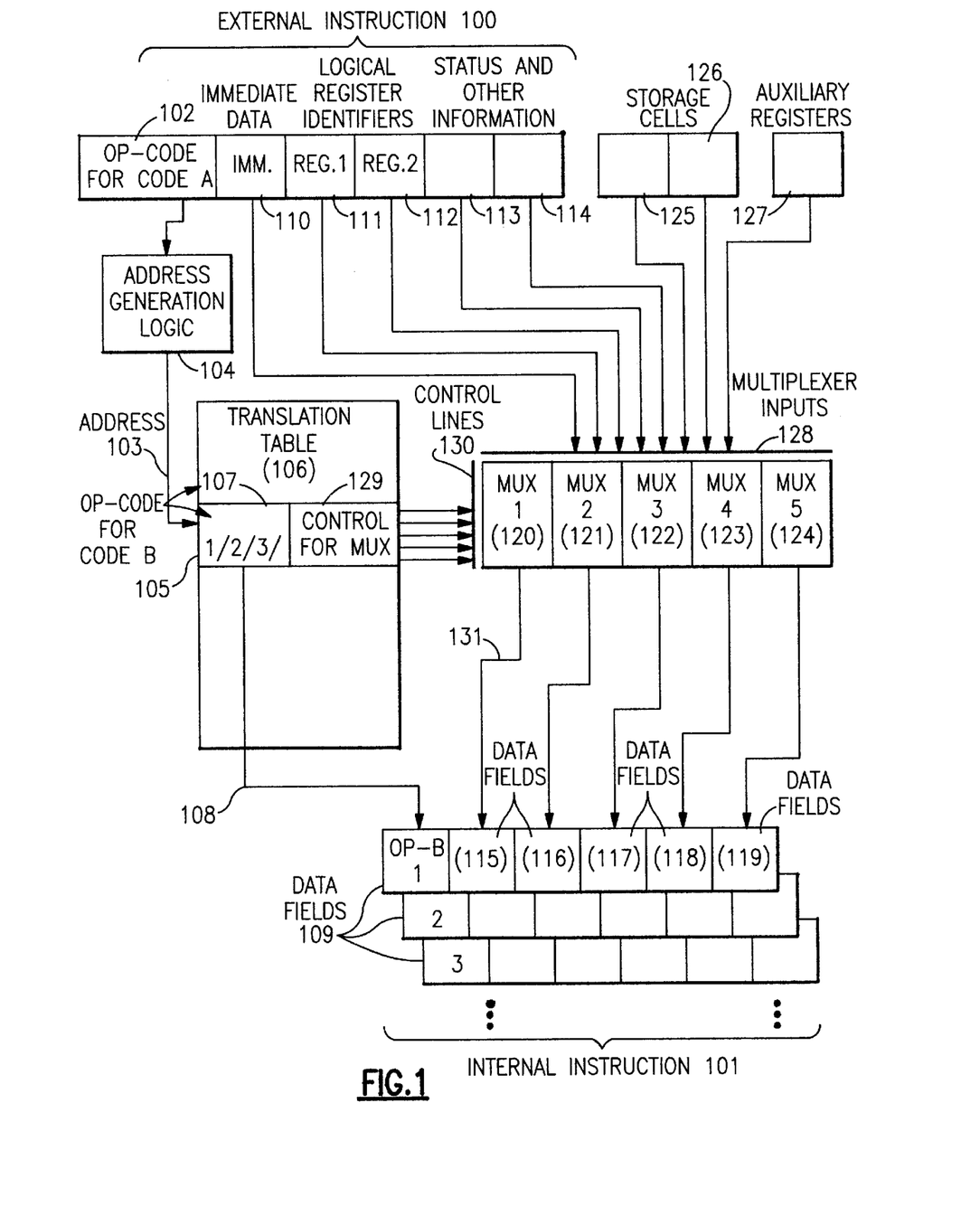
FIG. 1 shows the general setup of an instruction converter which translates external instructions to a number of internal instructions.

FIG. 1 shows the general setup of an instruction converter, which translates an external instruction (100), which can be either a CISC instruction or a RISC instruction, to at least one internal instruction (101). In case said internal instructions are to be processed by a superscalar processor, it is advantageous to internally use RISC code. Internal RISC instructions, which have been brought to one common format, are ideally suited for out-of-order processing.

The external instruction 100, which is an instruction of code A, comprises an OP-code of code A (102), an "immediate" data field (110), logical register identifiers (111, 112) which specify the instruction's source and target registers, and additional information about the instruction, such as status bits.

The value contained in the "immediate" data field might be needed for performing a so-called "immediate operation", such as "OR immediate", "AND immediate", etc. Said value specifies the constant that is to be ANDed or ORed with the other operand of the immediate operation. In address arithmetics, the value contained in the "immediate" data field is used for specifying the "displacement" of an address.

Rearrangement information needed for converting the external instruction (100) to a set of internal instructions (101) is contained in a translation table (106). Said translation table can either be implemented as a ROM table or as a RAM table. Each entry (105) of said table corresponds to one of said external code A instructions (100), and determines how the instruction elements of this specific instruction are to be rearranged in order to form the corresponding internal instructions (101).

As each translation table entry (105) corresponds to one external code A instruction (100), the OP-code (102) of said external instruction can be used to determine the correct translation table entry. This is done by forwarding the OP-code (102) to an address generation logic (104), which converts said OP-code to the address of the corresponding entry in the table. This address is then used to access (103) the corresponding translation table entry (105). Said entry contains the OP-codes of all the internal code B instructions (107) to which the external instruction is to be converted to, and multiplexer control information (129), which is used for controlling the recombination of the external instruction's elements.

The code B OP-codes 107 contained in the table entry can directly be forwarded (108) to the respective data fields 109 of the internal instructions that are to be generated.

Recombination of the external instruction's elements, such as the "immediate" value (110), logical register identifiers (111, 112), status information, and others (113, 114), is performed by a set of multiplexers (120–124). Each multiplexer corresponds to one data field of the internal code B instructions; and the output of each multiplexer is directly written to the corresponding data field. Thus, MUX 1 (120) writes directly (131) to data field 115 of the code B instruction OP-B1, MUX 2 (121) corresponds to data field 116, the output of MUX 3 (122) is directly forwarded to data field 117, etc.

Each of the multiplexers (120–124) can select among a variety of possible inputs. Said possible inputs comprise all the data contained in the external code A instruction, such as the "immediate" data field 110, logical register identifiers (111, 112) for both source and target registers, status information, and others (113, 114). But besides the data contained in the external instruction, data contained in defined storage cells of the processor can be used as an input to said multiplexing means. The content of said storage cells might simply consist of constants that are permanently contained in said storage cells. Let's assume that the storage cells 125 and 126 contain two different constants, and that said two cells can be selected as an input to any of the multiplexers 120–124. In case storage cell 125 is selected, its content, which is said constant, is written to the internal instruction's data field. The constant might, for example, specify a certain processor register. This means that the name of this specific register can be selected by the multiplexer and forwarded to an internal instruction as a source or target register. The storage cells 125, 126 thus contain the names of logical registers that are to be used by said internal instructions.

Additionally, there exist auxiliary registers (127) that are also used as an input to said multiplexing means. In case the auxiliary register contents are selected as an input, their content is forwarded to a data field of the internal instruction. These auxiliary registers temporarily contain the names of logical registers.

For example, let's assume that instruction 100 is a complicated CISC instruction, which uses several logical source and target registers. When decoding this CISC instruction to a number of simple RISC operations, said RISC operations generate intermediate results. For the purpose of passing on intermediate results between different RISC instructions related to one CISC instruction, logical registers have to be temporarily provided. The name of such a logical register that holds intermediate results might be contained in storage cell 127. When the RISC instructions corresponding to one CISC instruction are built, the name of said intermediate logical register might be forwarded from storage cell 127 to any of the RISC operation's data fields, in order to specify a source or target register.

Each multiplexer selects one of the different inputs that have been discussed (128), and links the selected input to its output. The selection is performed by a number of control lines (130).

Each translation table entry holds the total MUX control information (129) necessary for translating the initial code A instruction. Said control information is segmented according to the number of internal operation that have to be built, and according to the operands of said internal instructions. Per operand of an internal instruction, a number of bits is provided, which select one of the possible inputs (110–114, 125, 126, 127), that is to be forwarded to the internal instruction operand's data fields. The MUX control information in the translation table (129) is thus segmented in a number of bit patterns corresponding to the internal instructions' operands.

The advantage of such a segmentation is that said bit patterns can directly be used to control the multiplexer corresponding to one data field of said internal instructions. For example, MUX 2 (121) holds the second operand of the first internal instruction that is to be generated. Said MUX 2 is provided with the part of said MUX control information 129 that corresponds to data field 116, in order to select the input that is to be forwarded to data field 116. The bit pattern delivered by the RAM table can directly be used to control (130) which of the possible inputs (110–114, 125, 126, 127) is to be forwarded, via the output of MUX 2, to data field 116.

Figure 2:
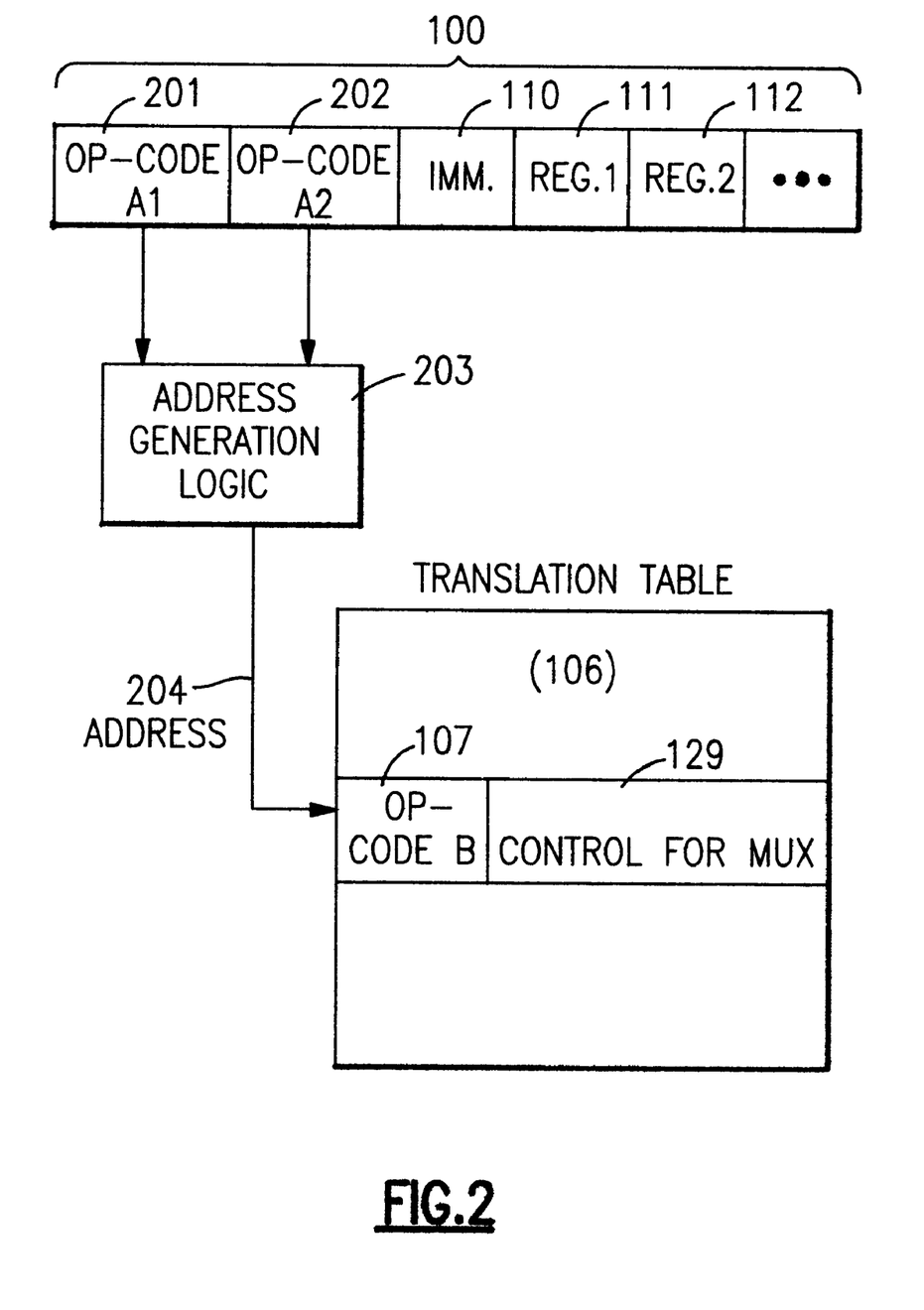
FIG. 2 shows how the OP-codes of the external instructions are used to access the correct entry of a table holding the necessary information for converting said external instruction.

In FIG. 2, it is shown how the correct translation table entry corresponding to one external instruction (100) can be found, in case said external instruction is defined by more than one OP-code. In the example of FIG. 2, the two OP-codes OP-A1 (201) and OP-A2 (202) are both forwarded to an address generation logic (203) which decodes said OP-codes to an address in the translation table (106). By accessing this table address (204), the corresponding code B OP-codes (107), and the corresponding multiplexer control information (129) can be determined.

Figure 3:
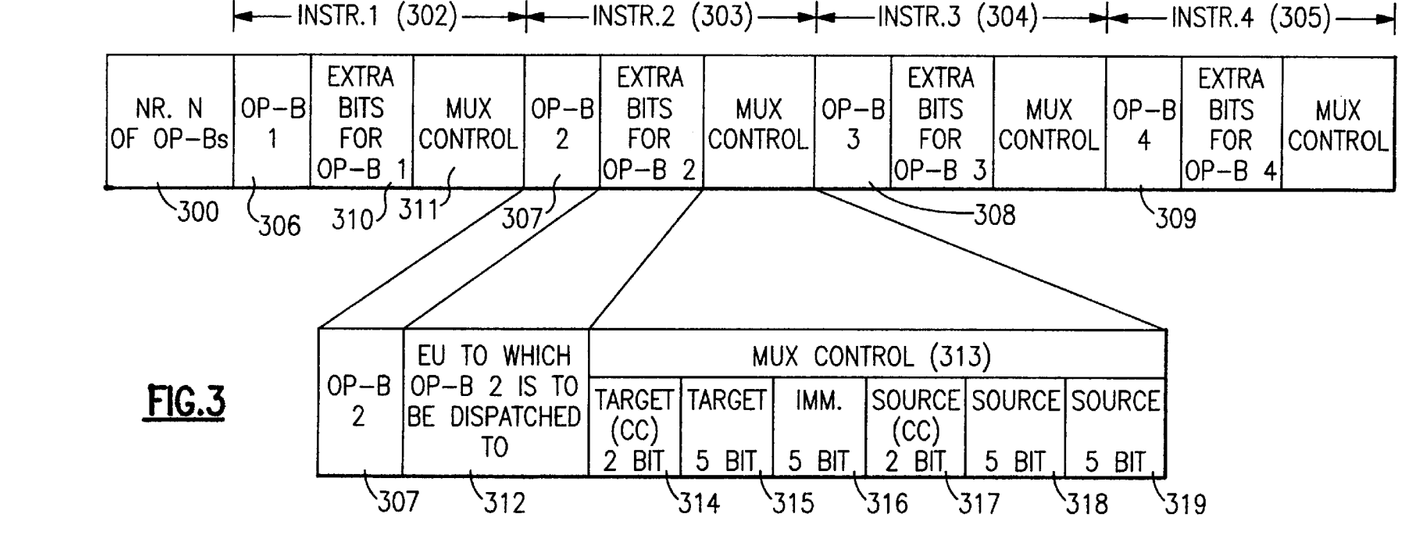
FIG. 3 depicts the structure of an entry in the translation table.

FIG. 3 depicts the structure of a translation table entry. The translation table (106) can be implemented as an array, with each row of said array holding the information corresponding to one code A instruction. A typical array would comprise several hundred entries.

In the example given in FIG. 3, an external instruction has to be converted to several internal instructions. The first data field of the entry holds the number n of internal code B instructions corresponding to said external code A instruction. In our example, n is equal to 4, and therefore, four internal instructions have to be generated.

The control information is segmented according to the instructions to be generated, there exists control data for instruction 1 (302), for instruction 2 (303), for instruction 3 (304), and for instruction 4 (305). The control information corresponding to each instruction to be generated comprises the code B OP-code of said internal instruction. In the control data field for instruction 1 (302), OP-B1 (306) is given, and correspondingly, in the control information blocks of instructions 2 to 4, OP-B2 (307), OP-B3 (308), and OP-B4 (309) are given.

Next, some extra bits, such as status bits, are provided for each code B OP-code (310). For example, it is specified for each of the internal instructions, to which execution unit it is to be dispatched to (312). Then, the bit patterns used for MUX control (311) are provided.

In order to understand how the MUX control bit patterns correspond to the internal instructions' operands, the control information of instruction 2 (303) is shown in more detail. The MUX control data field (313) for instruction 2 contains bit patterns for each operand of the internal instruction 2. Each bit pattern specifies which of a multitude of possible inputs is to be forwarded to one specific operand data field of the internal instruction, in this case instruction 2. Thus, there exists one bit pattern per internal instruction operand (314, 315, 317, 318, 319).

Logical source registers have to be specified by 5 bits (318, 319), whereby condition code used as a source operand (317) requires two bits, in our implementation. Five select bits are necessary to route the correct instruction part to the "immediate" data field (316). In order to route the correct code A instruction part to the target data field of instruction 2, five select bits are necessary (315). To indicate whether said internal instruction 2 depends on the actual condition code, 2 bits have to be provided (317). To indicate whether said instruction 2 generates new condition code, which means that the actual condition code is modified, two bits are required (314).

Figure 4:
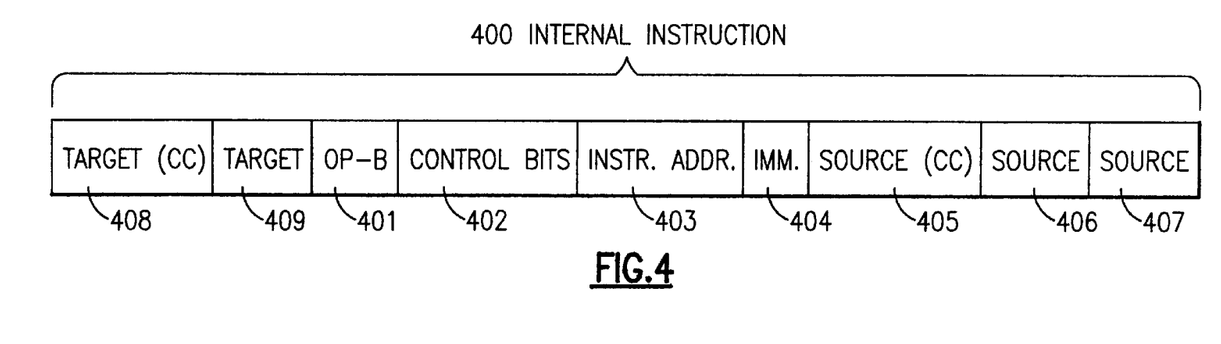
FIG. 4 shows an example for a format the internal instruction could have.

FIG. 4 shows the format of an internal instruction, which typically is a RISC instruction. The instruction format given in FIG. 4 separates operands into source operands and target operands and is therefore well-suited for data dependency resolution in superscalar RISC processors. The internal instruction format comprises a data field (401) for the code B OP-code OP-B, and several control bits (402). Furtheron, the instruction address of the corresponding code A instruction is forwarded to the corresponding internal instructions and stored in data field 403. By means of this instruction address, jumps and branches in the external instruction sequence can be translated to the internal instruction sequence. Data field (404) is the "immediate" data field, which contains constants used either in immediate operations or in address arithmetics. Data fields 405, 406, and 407 specify the internal instruction's source operands. The names of two logical registers, that are to be used as source operands, are contained in data fields 406 and 407.

The actual condition code can also be used as a source operand, for example in a "branch on condition" operation. In these cases, it is indicated in data field 405 that the actual condition code is to be used as one of the instruction's sources.

It also has to be specified, in the instruction, where result data is to be written to. Data field 409 contains the name of the logical register that is to be used as a target register. Additionally, an instruction might modify the actual condition code and thus produce a new condition code value. In this case, the new condition code is to be treated as a target operand, and this is indicated in data field 408.

Figure 5:
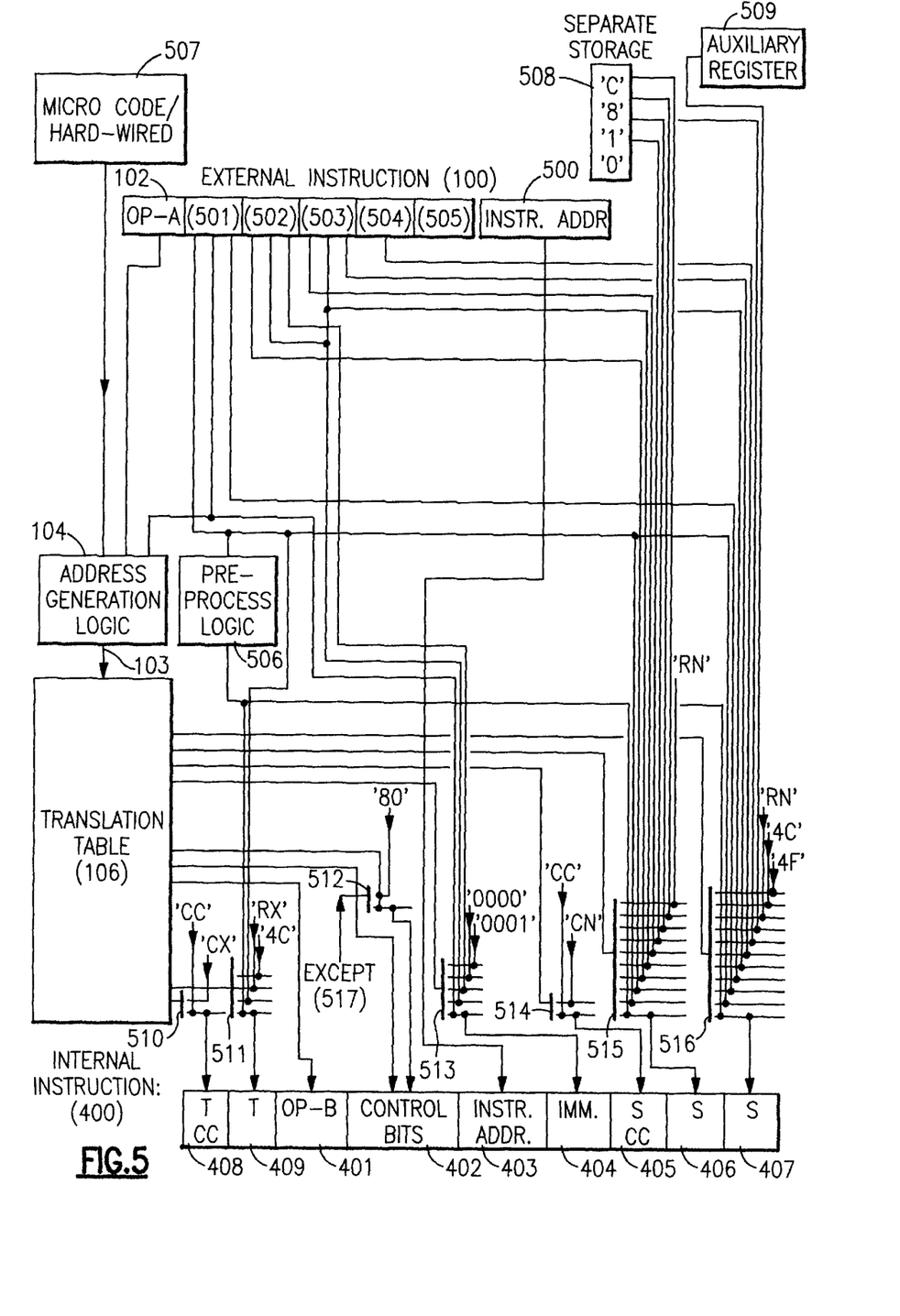
FIG. 5 shows the layout of an instruction converter using several multiplexers for instruction translation.

FIG. 5 shows the layout of an instruction converter in a more detailed way. An external code A instruction (100) is to be translated to code B. This is done by obtaining rearrangement information from a translation table 106, and said rearrangement information is used to control a set of multiplexers (510–516). The output of each multiplexer corresponds to one data field of the internal code B instruction (400) that is to be generated.

The external instruction's OP-code OP-A (102) is forwarded to the address generation logic (104). This allows to determine the translation table entry corresponding to OP-A. Said translation table entry contains all the control information needed for each of the multiplexers 510–516. Therefore, said control information is structured according to the data fields of the internal instructions that are to be generated. Each part of the control information is forwarded to its respective multiplexer, in order to select one of the possible inputs of each multiplexer. The selected input is forwarded to the multiplexer's output and written to the data field of the internal instruction (400) to which said multiplexer corresponds.

In order to generate said internal instruction (400), the code B OP-code OP-B is read from the translation table entry corresponding to OP-A, forwarded to the internal instruction, and stored to data field 401. The instruction address (500) of the external instruction 100 is also directly forwarded to the corresponding data field 403 of said internal instruction.

These two data fields of the internal instruction, the data field for the OP-code and the data field for the instruction address, are the only ones that are not coupled to the output of a multiplexer.

In order to understand how the multiplexers work, let us now have a look at how names of logical registers are forwarded to the internal instruction's source data fields 406 and 407. Each of the corresponding multiplexers 515 and 516 has a wide range of possible inputs. The instruction elements 501–505 of the external instruction, which might contain names of logical source registers, are inputs of said multiplexers.

Depending on the instruction's context, it might also make sense to use pre-specified logical register names as inputs. These "constant" names of logical registers are contained in a separate storage 508. These "constants" can also be implemented as hard-wired inputs to said multiplexers 515 and 516. In the example of FIG. 5, the logical register names "RN", "4C" and "4F" are constant inputs of multiplexer 516.

But besides using these constant register names, it is also possible to dynamically allocate logical registers. The names of said logical registers are written to an auxiliary register. Said multiplexers can access said auxiliary registers in order to forward the names of said dynamically allocated registers to respective source data fields (406, 407).

Said permanently allocated and said dynamicly allocated registers are especially useful when a complex external instruction is converted to a number of internal RISC instructions. New data dependencies arise between said corresponding RISC instructions. For example, an intermediate result produced by a first RISC instruction has to be forwarded to a second RISC instruction. In this case, a logical register has to be reserved, which is used as a target by the first instruction and as a source by the second instruction, in order to be able to pass data between the internal instructions.

Basically the same considerations are applied when looking at how the target operands are specified. The corresponding multiplexer 511 can either forward an instruction element of the external instruction (501–505) or a pre-specified register name to target operand field 409.

Said instruction elements of the external instruction (501–505) are either directly forwarded to the multiplexers, or they are modified by a preprocess logic (506) first.

The "immediate" data field 404 does not contain the name of a logical register; it contains a constant value. Said constant can either be obtained from an instruction element (501–505) of the external instruction, or from a constant input, such as "0000" or "0001", which is directly applied to the input of multiplexer 513. For example, by selecting "0001", this value is written to "immediate" data field 404, and an "add immediate" operation would simply perform an increment by one.

Source data field 405 and target data field 408 refer to the handling of condition code. In case the internal instruction 400 depends on the actual condition code, "CC" is forwarded by multiplexer 514 to data field 405. This indicates that the actual condition code is to be used as a source operand. In case the internal instruction does not use condition code as a source operand, "CN" is written to data field 405.

The target data field 408 is handled accordingly. In case the internal instruction 400 modifies the actual condition code, the new condition code is considered as a target operand, and "CC" is written to data field 408. Otherwise, "CX" is stored to data field 408.

Several of the control bits (402) of the internal instruction can be directly obtained from the corresponding translation table entry. For example, the execution unit to which the internal instruction is to be dispatched to (312) can be directly obtained. Additionally, there exists a multiplexer (512), which takes care that whenever an exception (517) occurs, the corresponding control bits are modified accordingly.

In a lot of instruction codes, only a subset of the total instruction set is hard-wired. These are the real basic instructions. All the other instructions of said instruction code are implemented as microcode instructions, which rely on said hard-wired instructions. Each microcode instruction consists of a sequence of hard-wired instructions.

For example, the "move character long" instruction, which is a microcode instruction, consists of the basic instruction "move character", and of a loop control.

There exist two possible methods for applying the instruction conversion mechanism described to microcode instructions. The first method is to relate each microcode instructions of code A to a huge number of explicitly defined internal instructions of code B. Of course, these internal instructions would have to be generated sequentially.

The second method is to first translate said microcode instructions of code A to the corresponding sequence of hard-wired instructions of code A. Then, in a next step, each of the hard-wired external instructions has to be translated to the corresponding sequence of internal instructions by means of the translation table 106. The advantage of this second solution is that for each hard-wired external instruction, the corresponding internal instructions can be generated in parallel.

When performing such a two-step translation of each microcode instruction, the instruction elements of said microcode instruction have to be buffered in said auxiliary registers (509) first. Then, the translation table entry corresponding to said external microcode instruction is accessed. This table entry points to a location in memory, where the sequence of hard-wired external instructions corresponding to said microcode instruction is stored.

Now, each of the hard-wired external instructions can be converted, one after the other, to internal instructions. Whenever a logical register of the microcode instruction has to be addressed, the name of said logical register can be obtained from said auxiliary registers. Dependent on whether the external instruction that is to be translated is a microcode instruction or a hard-wired instruction (507), the adequate translation mode can be chosen.

We claim:

1. An apparatus for converting instructions of a first instruction set to instructions of a second instruction set, wherein said second instruction set may be processed by a first processor type and wherein said first processor type cannot process said first instruction set, and wherein each of said instructions of said first instruction set and said second instruction set includes instruction elements, said apparatus comprising:

a table means, relating an instruction of said first instruction set to rearrangement information corresponding to said instruction of said first instruction set; and a rearrangement means, which uses said instruction elements of said instruction of said first instruction set as a first input, and uses said rearrangement information corresponding to said instruction of said first instruction set as a second input, and which rearranges said instruction elements of said instruction of said first instruction set, according to said rearrangement information, in order to generate at least one instruction of said instructions of said second instruction set functionally corresponding to said instruction of code A.

2. An apparatus according to claim 1, characterized by said table means being realized as RAM table means.

3. An apparatus according to claim 1, characterized in that said table means are realized as ROM table means.

4. An apparatus according to claim 1 characterized in that said instructions of said first instruction set are CISC instructions, and said instructions of said second instruction set are RISC instructions.

5. An apparatus according to claim 1, characterized in that, both said instructions of said first instruction set and said instructions of said second instruction set are RISC instructions.

6. An apparatus according to claim 1, characterized in that said rearrangement means are realized as multiplexing means, which multiplex said instruction elements of said instructions of said first instruction set to respective data fields representing instruction elements of at least one functionally corresponding instruction of said instructions of said second instruction set.

7. An apparatus according to claim 1, characterized in that said rearrangement information corresponding to said instruction of said first instruction set comprises routing information per instruction element of said instruction or said instructions of said second instruction set, with said instruction or said instructions of said second instruction set functionally corresponding to said instruction of said first instruction set, and with said routing information determining which of said instruction elements of said instruction of said first instruction set is to be forwarded to a respective data field representing one of said instruction elements of said instruction or instructions of said second instruction set.

8. An apparatus according to claim 1, characterized in that said table means relate an instruction of said instructions of said first instruction set to at least the OP-code of at least one functionally corresponding instruction of said instructions of said second instruction set.

9. An apparatus according to claim 1, characterized in that said table means relate an instruction of said instructions of said first instruction set to a plurality of functionally corresponding instructions of said second instruction set.

10. An apparatus according to claim 1 wherein said instruction elements include at least one OP-code and wherein said apparatus further includes a decoder for decoding said OP-code of said instruction of said first instruction, said decoded OP-code determining a location in said table means for said rearrangement information corresponding to said instruction of said first instruction set.

11. An apparatus according to claim 10 wherein said instruction elements further include one or more operands and wherein said rearrangement information in said location in said table means includes control information for multiplexing the operands of said instruction in said first instruction set to registers for said operands in said functionally corresponding at least one instruction of said instructions of said second instruction set.

12. A method for converting instructions of a first instruction set to instructions of a second instruction set wherein said second instruction set may be processed by a first processor type and wherein said first processor type cannot process said first instruction set, and wherein each of said instructions of said first instruction set and said second instruction set includes instruction elements, said method comprising the steps of:

obtaining rearrangement information from at least one table, said rearrangement information corresponding to an instruction of said instructions of said first instruction set that is to be converted to said second instruction set; and rearranging said instruction elements of said instruction of said first instruction set according to said rearrangement information, in order to generate at least one instruction of said instructions of said second instruction set.

13. A method according to claim 12, characterized by providing said table or said tables as a RAM table or RAM tables.

14. A method to claim 12, characterized by providing said table or said tables as a ROM table or ROM tables.

15. A method according to claim 12, characterized by said instruction of said first instruction set being CISC instructions and said instructions of said second instruction set being RISC instructions.

16. A method according to claim 12, characterized by both said instructions of said first instruction set and said instructions of said second instruction set being RISC instructions.

17. A method according to claim 12, further comprising a step of multiplexing said instruction elements of said instruction of said first instruction set to respective data fields representing instruction elements of at least one functionally corresponding instruction of said instructions of said second instruction set according to said rearrangement information.

18. A method according to claim 12, further comprising a step of obtaining the number of instructions of said second instruction set corresponding to said instruction of said first instruction set from said table or said tables.

19. A method according to claim 12, further comprising a step of obtaining at least one OP-code of at least one instruction of said instructions of said second instruction set functionally corresponding to said instruction of said first instruction set from said table or tables.

20. A method according to claim 12, further including the following steps:

providing routing information per instruction element of said instruction or instructions of said second instruction set said instruction or instructions of said second instruction set functionally corresponding to said instruction of code A, and determining, according to said routing information, which of said instruction elements of said instruction word of said first instruction set is to be forwarded to a respective data field representing one of said instruction elements of said instruction or said instructions of said second instruction set.

* * * * *